(12) United States Patent
Watts et al.

(10) Patent No.: US 9,339,085 B2
(45) Date of Patent: May 17, 2016

(54) DOUBLE-SIDED FASTENERS

(71) Applicant: Velcro Industries B.V., Willemstad, Curacao (NL)

(72) Inventors: Mary L. Watts, Warner, NH (US); James T. Grady, Chester, NH (US); Andrew Collins, Bedford, NH (US)

(73) Assignee: Velcro BVBA, Deinze (BE)

( * ) Notice: Subject to any disclaimer, the term of this patent is extended or adjusted under 35 U.S.C. 154(b) by 255 days.

(21) Appl. No.: 14/053,720

(22) Filed: Oct. 15, 2013

(65) Prior Publication Data

US 2014/0106952 A1  Apr. 17, 2014

Related U.S. Application Data

(60) Provisional application No. 61/713,850, filed on Oct. 15, 2012.

(51) Int. Cl.
*B44C 3/12* (2006.01)
*B32B 7/08* (2006.01)
(Continued)

(52) U.S. Cl.
CPC ............... *A44B 11/02* (2013.01); *A41F 9/025* (2013.01); *A44B 18/0084* (2013.01); *A41F 9/002* (2013.01);
(Continued)

(58) Field of Classification Search
CPC . Y10T 24/27; Y10T 24/2708; Y10T 24/4764; Y10T 156/1008; Y10T 156/1011; Y10T 156/1013; Y10T 156/1015; Y10T 156/1051; Y10T 156/1084; Y10T 428/24017; A61F 13/62; A61F 13/622; A61F 13/00987; B29C 65/00; B29C 65/02; B29C 65/18; B29C 65/606; B29C 66/1122; B29C 66/114; B29C 66/20; B29C 66/3032; B29C 66/431; A44B 18/00; A44B 18/0069; A44B 18/0084; B29L 2031/729
USPC ............ 156/60, 63, 66, 72, 91, 92, 196, 199, 156/200, 201, 202, 203, 204, 216, 217, 227, 156/290, 291, 304.1, 304.6, 304.7, 308.2, 156/308.4, 309.6; 24/298, 302, 197, 31 V, 24/442, 306, 444, 265 R, 265 A, 265 AL; 493/394
See application file for complete search history.

(56) References Cited

U.S. PATENT DOCUMENTS 4,937,920 A * 7/1990 Tsai ........................ A44C 5/00
 24/3.2
4,939,818 A  7/1990 Hahn
(Continued)

FOREIGN PATENT DOCUMENTS

EP  761184 A3  2/2000
WO  WO9402091 A1  2/1994

OTHER PUBLICATIONS

Partial International Search Report mailed Aug. 22, 2014 for PCT/EP2013/071447 (4 pp).
(Continued)

*Primary Examiner* — Philip Tucker
*Assistant Examiner* — Brian R Slawski
(74) *Attorney, Agent, or Firm* — Fish & Richardson P.C.

(57) ABSTRACT

A method for forming a double-sided loop strap includes: receiving a continuous longitudinal strip of loop material including a strip-form base bearing a field of upstanding loops on a fastening side of the strip bounded by opposite longitudinal edges, folding each of the longitudinal edges away from the fastening side, such that the base overlaps itself, and securing the folded edges in place by permanently bonding together overlapped areas of the base to form the double-sided loop strap.

7 Claims, 13 Drawing Sheets

(51) Int. Cl.
*B31F 1/00* (2006.01)
*A61F 13/15* (2006.01)
*B29C 65/00* (2006.01)
*B32B 37/00* (2006.01)
*C08J 5/00* (2006.01)
*A44B 1/04* (2006.01)
*A44B 11/25* (2006.01)
*A44B 15/00* (2006.01)
*A44B 17/00* (2006.01)
*A44B 18/00* (2006.01)
*A44B 11/02* (2006.01)
*A41F 9/02* (2006.01)
*B29C 65/18* (2006.01)
*B29C 65/60* (2006.01)
*A41F 9/00* (2006.01)

(52) U.S. Cl.
CPC ............... *B29C 65/18* (2013.01); *B29C 65/606* (2013.01); *B29C 66/20* (2013.01); *B29C 66/3032* (2013.01); *B29C 66/431* (2013.01); *Y10T 24/318* (2015.01); *Y10T 24/4764* (2015.01)

(56) References Cited

U.S. PATENT DOCUMENTS

| | | |
|---|---|---|
| 5,015,251 A | 5/1991 | Cherubini |
| 5,769,290 A | 6/1998 | Pestana |
| 6,827,893 B2 | 12/2004 | Clune |
| 7,472,925 B2 | 1/2009 | Freeman et al. |
| 7,601,284 B2 | 10/2009 | Clune |
| 8,069,540 B2 | 12/2011 | Obiols et al. |
| 2002/0078536 A1 | 6/2002 | Martin et al. |
| 2003/0099811 A1* | 5/2003 | Poulakis ............ A44B 18/0076 428/126 |
| 2003/0224137 A1 | 12/2003 | Chung |
| 2008/0201915 A1 | 8/2008 | Obiols et al. |
| 2013/0196110 A1* | 8/2013 | Cheng ................ A44B 18/0069 428/99 |

OTHER PUBLICATIONS

International Search Report and Written Opinion of International Application No. PCT/EP2013/071447 mailed Dec. 22, 2014.

* cited by examiner

DOUBLE-SIDED FASTENERS

TECHNICAL FIELD

This invention relates to double-sided loop straps, such as used in touch fastener products.

BACKGROUND

Double-sided fabrics are widely used in a variety of markets including, for example, the medical, apparel and sports markets. For applications in which a double-sided fabric is to engage with touch fasteners, either side may be constructed to be hook engageable. Such products are useful in medical and sports markets for applications such as straps, which may support medical devices on a patient, or in braces that may be wrapped around body parts, such as elbows or knees as support. In some applications, these double-sided, hook compatible straps are intended for skin contact, and must therefore be comfortable to the touch and breathable (i.e., air permeable) to some degree.

SUMMARY

One aspect of the invention features a method for forming a double-sided loop strap, including: receiving a continuous longitudinal strip of loop material including a strip-form base bearing a field of upstanding loops on a fastening side of the strip bounded by opposite longitudinal edges, folding each of the longitudinal edges away from the fastening side, such that the base overlaps itself, and securing the folded edges in place by permanently bonding together overlapped areas of the base to form the double-sided loop strap. The bonding forms discrete bonded regions of the base surrounded by unbonded area, the bonded regions including a row of the bonded regions extending along and overlapping at least one of the folded edges, and a pattern of bonded regions surrounded by engageable loops on either side of the strap.

In some examples, folding each of the longitudinal edges includes folding the edges sufficiently inward to meet on one side of the strap. In some implementations, the row of bonded regions forms a seam along the longitudinal edges.

In some applications, the bonded regions of the row of bonded regions are shaped to form visually recognizable graphics.

In some cases, a density of the pattern of bonded regions varies widthwise and/or lengthwise along the strap.

In some embodiments, the density of the pattern of bonded regions gradually increases from the center area of the strap in an outboard direction.

In some examples, permanently bonding includes heat staking overlapped areas of the base.

Another aspect of the invention features a double-sided loop strap, including: a first side including a first loop-bearing surface, and a second side opposite the first side, the second side including a second loop-bearing surface and an adjacent grip area covered by a grip material forming an exposed grip surface, where the exposed grip surface is recessed below the second loop-bearing surface.

In some examples, the grip area includes a longitudinally continuous lane bounded on both sides by loop material.

In some cases, the grip surface features protrusions of the grip material.

In some applications, the first loop-bearing surface is of a loop material forming one broad side of the strap opposite the grip surface, and the second loop-bearing surface is of a loop material having a longitudinal edge adjacent to the grip surface and secured by the grip material.

In some embodiments, the grip area has a lateral extent of between 10 and 90 percent of an overall width of the strap.

In some examples, the first loop-bearing surface is of a loop material forming one broad side of the strap opposite the grip surface, and the second loop-bearing surface is of a loop material having an edge bounding a hole through the loop-bearing surface.

In some implementations, the grip material has a dynamic coefficient of frication that is greater than about 0.3.

Yet another aspect of the invention features a double-sided loop strap, including: a first side including a first loop-bearing surface, and a second side opposite the first side, the second side including a second loop-bearing surface and an adjacent grip area covered by a grip material forming an exposed grip surface, where the exposed grip surface is bounded by an edge of the second loop-bearing surface.

In some examples, the edge is a continuous longitudinal edge of the second loop-bearing surface.

In some applications, the edge bounds a hole through the second loop-bearing surface.

In some cases, the grip material extends underneath and bonds the edge.

In some implementations, the grip surface is recessed below the second loop-bearing surface.

In some embodiments, the grip material includes a foaming agent.

In some examples, a portion the grip surface is at least level with the second loop-bearing surface.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1A:
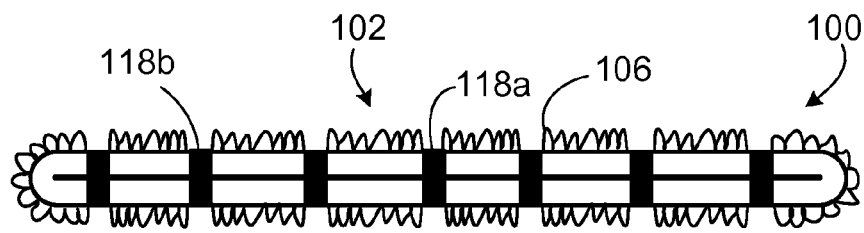
FIG. 1A is cross-sectional view of a double-sided loop strap.
Figure 1B:
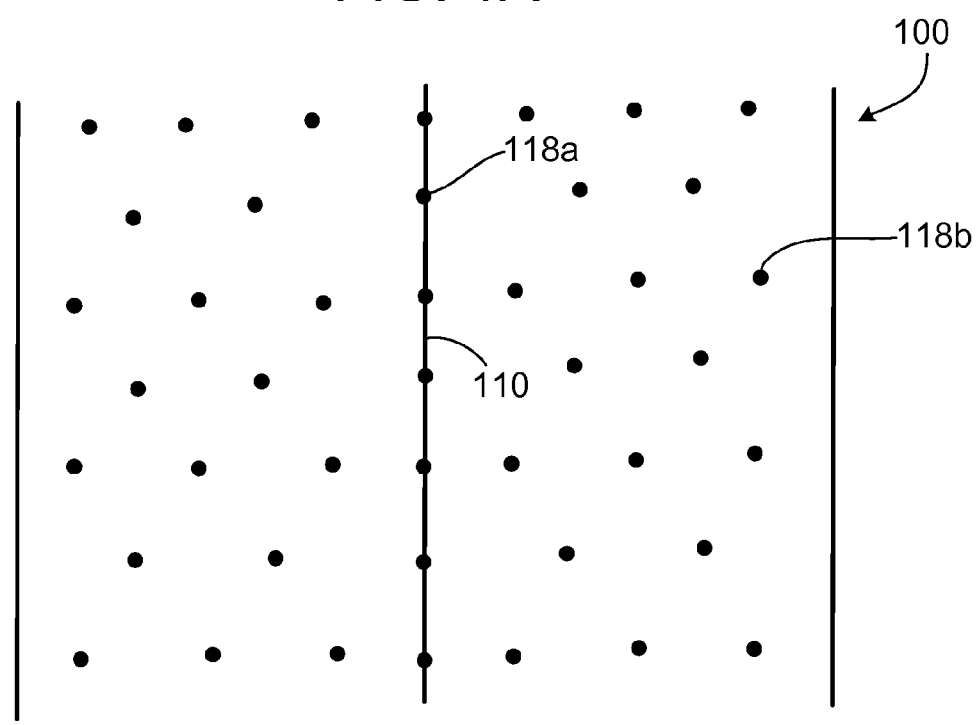
FIG. 1B is a top view of the double-sided loop strap of FIG. 1A.
Figure 1C:
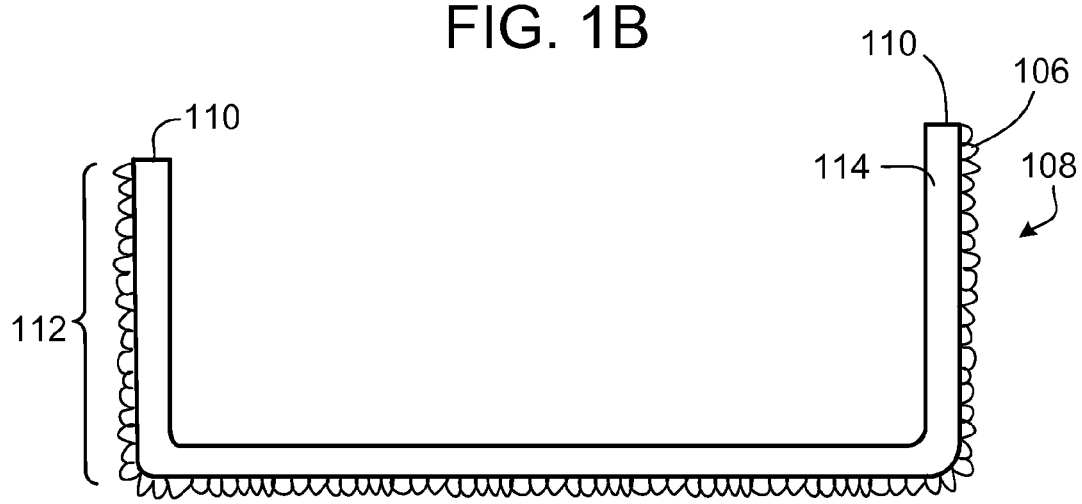
FIG. 1C is a cross-sectional view of a strip of loop material with folded edges.

FIGS. 1A and 1B show an example double-sided loop strap 100 having a front side 104 and a back side 102, each of which features a field of upstanding, hook compatible loops 106. Note that the convention of "front" and "back" is used herein for discussion purposes only, and is not intended to carry any significant meaning that would affect the scope of the present disclosure. In this example, loop strap 100 is a multi-layer construction fashioned from a preform elongated strip of loop material 108 defining a pair of free longitudinal edges 110 (see FIG. 1C). Edges 110 are folded over to form two inwardly facing arms 112 meeting edge-to-edge near a center area of the strip. As shown, strip 108 features a flexible base 114 bearing a field of upstanding loops 106 on one side. In particular, the loops extend from an outward surface of the base which is bounded by the free longitudinal edges.

The structure and physical properties of strip 108 may vary in different implementations. For example, the strip can have a woven loop structure (e.g., having napped or un-napped loops), a knitted loop structure and/or a non-woven loop structure. The materials used to manufacture strip 108 may also vary. For example, nylon, polyester, polypropylene, and/or aramid fibers can be used to manufacture the preform loop strip. Though not exhaustive, the foregoing examples illustrate the numerous different types of hook compatible fabrics that can be used in conjunction with the present technique. In general, the structure and material of the strip are selected based on an intended application of the product.

Referring back to FIGS. 1A and 1B, arms 112 are held in place against an inboard portion of flexible base 114 by an array of discrete bonded regions 118. As shown, each of the bonded regions is surrounded by an unbonded area of loop material. Bonded regions 118 can be formed, for example, using a heat staking process (e.g., ultrasonic heat staking) to fuse the folded, overlapping layers of loop material together at various discrete points. In this particular example, a single patterned band or row of bonded regions 118a extends along and overlaps the two longitudinal edges 110 to form a seam that holds strip 108 in a folded, two-layer configuration. An additional pattern of bonded regions 118b extends broadly over the other portions of the folded strip 108 to secure arms 112 firmly in place against flexible base 114. Using patterned arrays of discrete bonded regions to secure the preform strip in a folded configuration can be advantageous in many different applications. In particular, this type of construction may provide more flexibility than a similar strap, for example, where adhesives or a sewn seam are used to secure the folded outboard portions of the strip in place. Moreover, the present technique offers a substantial amount of air permeability so that the strap is "breathable" when in contact with a user's skin.

The outlining footprint of the bonded regions can vary between different implementations of the double-sided loop strap, so as to provide structurally different products. For example, the size of the bonded regions may differ from one application to the next. With other factors being equal, larger bonded regions will provide the strap more structural stability and bond strength than will smaller bonded regions. However, the stability and strength provided by the larger bonded regions comes at the cost of reduced flexibility, air permeability, and closure performance (e.g., shear, tensile, and peel strength). In particular, the reduction in closure performance is a result of the reduced loop material available for hook engagement, as the loops are pressed down and fused in the bonded regions. Similarly, the pattern density of the bonded regions can be a significant variable between different implementations. In particular, a denser pattern of bonded regions will tend to provide more dimensional stability and bond strength, while offering less flexibility, air permeability and closure performance. Generally, the above-described physical properties will vary according to a ratio comparing the total area of bonded regions to the total unbonded area of the strap. That is, structural stability and bond strength will increase when the total area of the bonded regions increases relative to the total unbonded area. On the other hand, flexibility, air permeability, and closure performance will increase when the total unbonded area increases relative to the total area of the bonded regions. Of course, various other properties of the loop strap may also be affected by the configuration of the bonded regions.

Referring again to FIGS. 1A and 1B, bonded regions 118b are provided in a precise geometrically regular pattern of uniform density, which provides substantially consistent and isotropic physical properties across strap 100. In some examples, however, the pattern of bonded regions is purposefully irregular to provide different physical properties around specific areas of strap 100, and/or to provide some directionality to these physical properties.

Figure 2A:
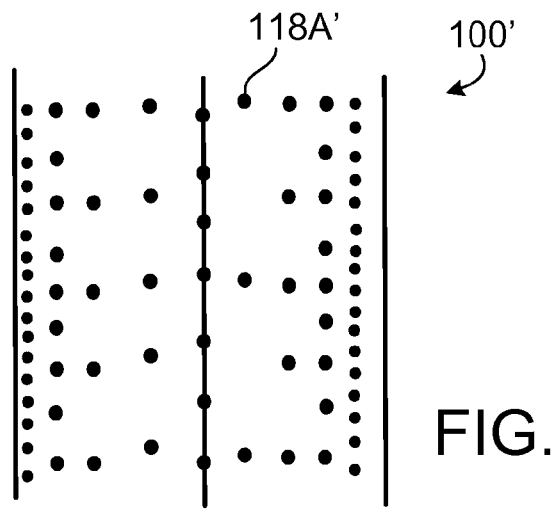
FIG. 2A is a top view of a first example double-sided loop strap featuring an irregular pattern of discrete bonded regions.
Figure 2B:
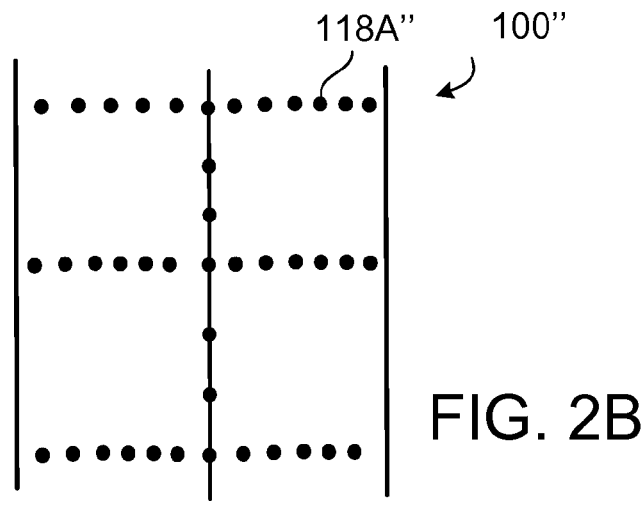
FIG. 2B is a top view of a second example double-sided loop strap featuring an irregular pattern of discrete bonded regions.

FIG. 2A shows an example where bonded regions 118b' are established in an irregular pattern. In particular, the pattern density of the bonded regions gradually increases from the center area of the strap in the direction of the outboard folds. In this embodiment, strap 100' would be stronger and stiffer at the outboard areas and more flexible and breathable near the center. Additionally, peel strength would be greater near the center of the strap than around the outboard areas, because there is more loop material available for hook engagement. FIG. 2B shows an example where bonded regions 118b" are established in another irregular pattern, where the distance between the bonded regions is smaller in the widthwise direction of the strap than in the lengthwise direction. In this case, strap 100" would be more flexible in the lengthwise direction and more rigid in the widthwise direction.

Figure 3:
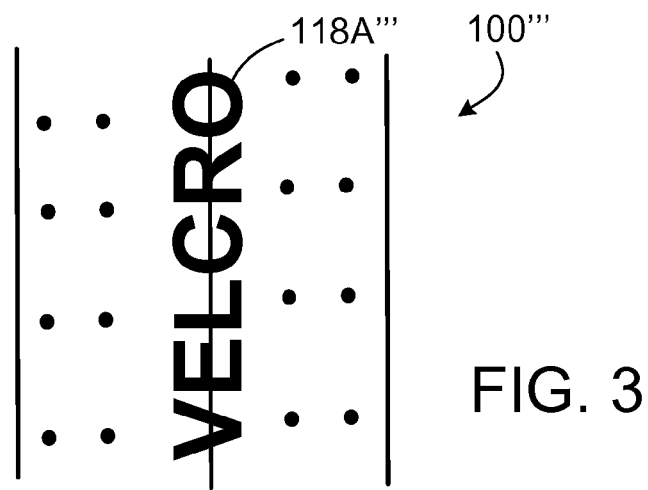
FIG. 3 is a top view of a double-sided loop strap featuring discrete bonded regions shaped as visually recognizable graphics.

As noted above, the row of bonded regions 118a overlaps edges 110 to form a seam along the back side 102 of strap 100. In the previous examples, bonded regions 118a are generally circular and distributed at a constant interval along longitudinal edges 110. FIG. 3 shows an example where bonded regions 118a''' are provided in different types of shapes, so as to form a visually distinguishable graphic. In this embodiment of strap 100''', bonded regions 118a''' are shaped as individual letters "V", "E", "L", "C", "R", and "O". Numerous types of shapes can be used to form graphic images such as for logos, brand names, and the like. FIG. 3 also provides an example where the bonded regions near the center area of the strap cover a greater area than the bonded regions near the outboard folds. This type of configuration would provide more bond strength and rigidity near the seam, the part of the strap offering the least structural integrity.

Figure 4A:
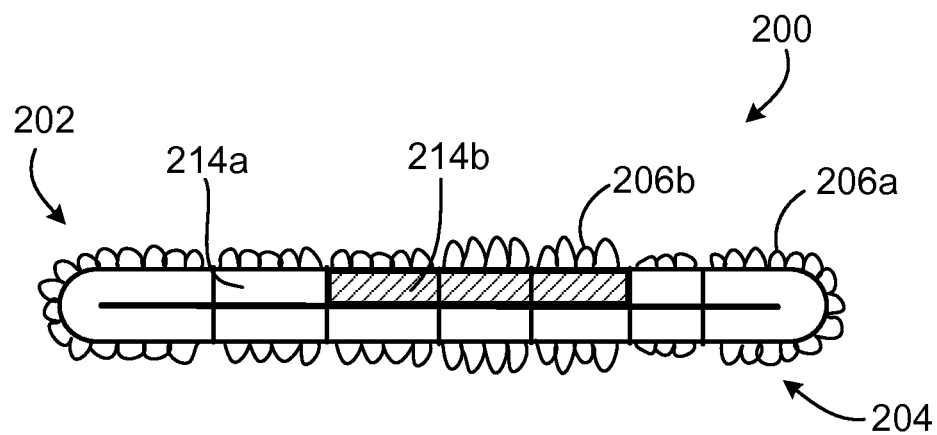
FIG. 4A is a cross-sectional view of a composite double-sided loop strap.
Figure 4B:
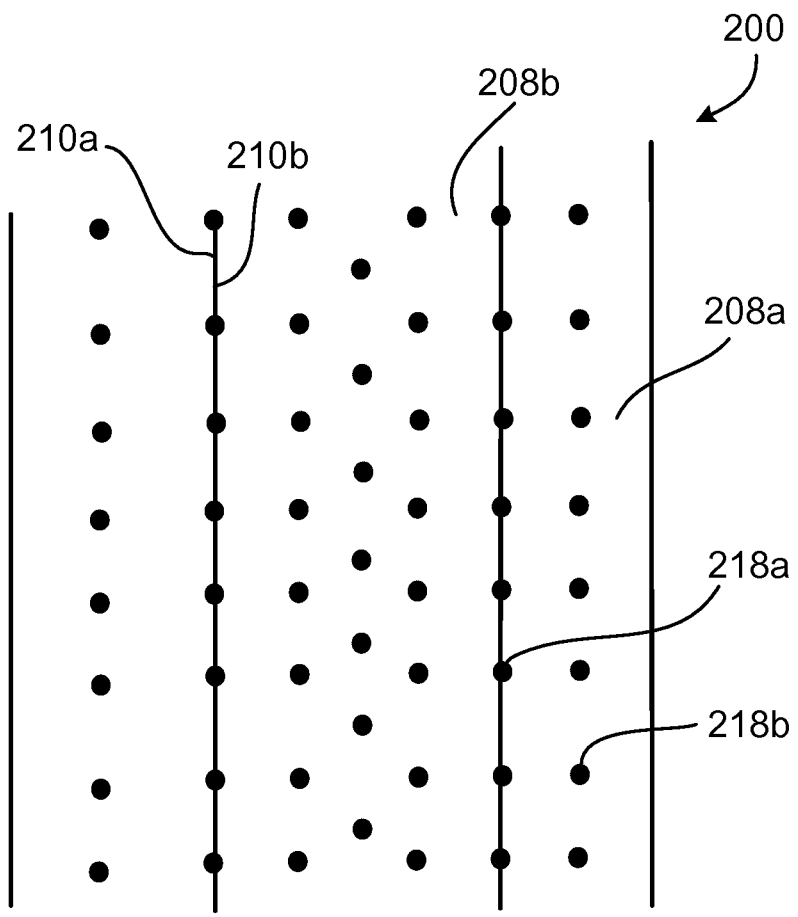
FIG. 4B is a top view of the composite double-sided loop strap of FIG. 4A.

FIGS. 4A and 4B show another embodiment of a double-sided loop strap 200. Strap 200 is similar to strap 100 described above. For example, strap 200 is a two-layered construction presenting hook compatible loops 206 on both a front side 204 and a back side 202 of the strap. In this example, strap 200 is a composite structure fashioned from two separate preform strips of loop material 208a and 208b, each of which includes a flexible base 214a,b bearing a field of upstanding loops 206a,b extending from an outward surface bounded by free longitudinal edges 210a,b. The strips are similar, but provide different types of loops, with loops 206a being presenting less loft than loops 206b. As shown, longitudinal edges 210a of strip 208a are folded over flexible base 214a to meet the respective edges 210b of strip 208b. Two similar sets of discrete bonded regions 218a are provided to secure the respective edges 210a and 210b in place against an inboard portion of flexible base 214a. As shown, each set of bonded regions 218a provides a row of regions extending along and overlapping the respective edges 210a and 210b. Similar to the previous examples, a pattern of bonded regions 218b extends broadly over other portions of strips 208a and 208b to secure the strips in a tightly bound construction.

Figure 5A:
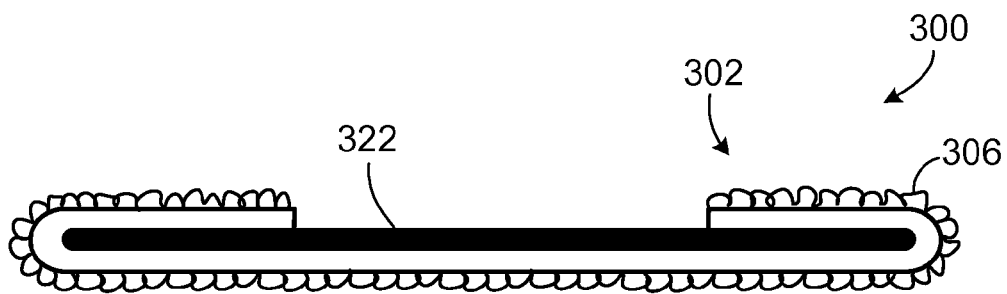
FIG. 5A is a cross-sectional view of a double-sided loop strap featuring a non-slip surface.
Figure 5B:
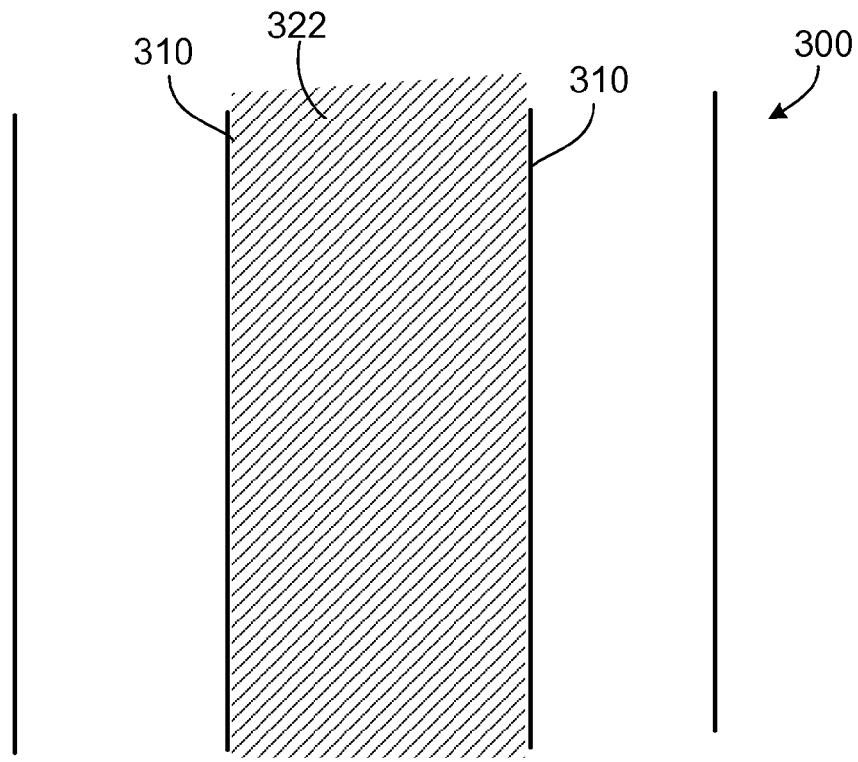
FIG. 5B is a top view of the double-sided loop strap of FIG. 5A.

FIGS. 5A and 5B show yet another double-sided loop strap 300 having a front side 304 and a back side 302, each of which presents a field of upstanding, hook compatible loops 306 facing outward therefrom. Similar to the previous examples, loop strap 300 is a two-layer construction fashioned from a preform elongated strip of loop material 308 with free longitudinal edges 310 folded over to form two inwardly facing arms 312. In particular, strip 308 includes a flexible base 314 bearing a field of upstanding loops 306 extending from an outward surface bounded by longitudinal edges 310.

Figure 5C:
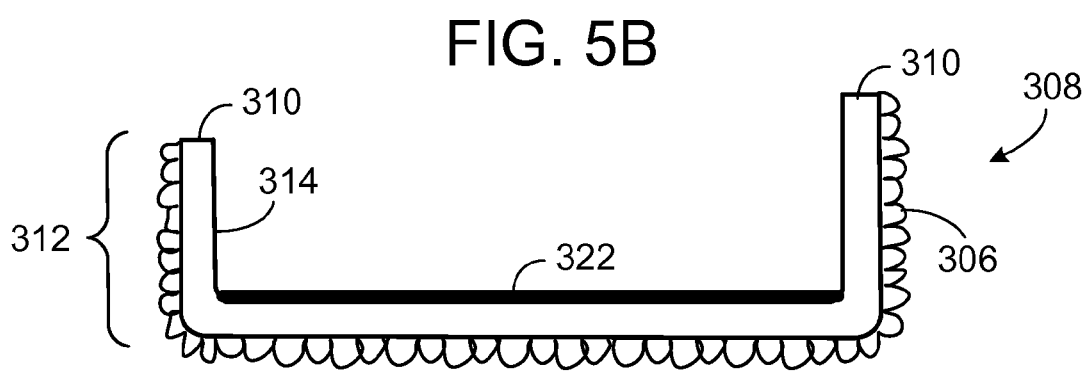
FIG. 5C is a cross-sectional view of a strip of loop material with folded edges carrying a deposit of resinous grip material.

In this example, a thin layer of resinous grip material 322 is deposited on an inboard portion of flexible base 314, on the back side of the base opposite loops 306 (see FIG. 5C). Longitudinal edges 310 are folded over the outer portions of the layer of grip material 322, such that outer portions of the layer of grip material are sandwiched between the two layers of loop material, while the center portion remains exposed between edges 310. As shown, the exposed surface of the grip material is recessed relative to the neighboring loop-bearing surface and bounded by the longitudinal edges. In various implementations, the exposed grip surface can have a lateral extent of between 10 and 90 percent of the overall width of the strap. In general, the loop strap will exhibit more gripping ability when a greater amount of the grip surface is exposed. The additional grip would come at a cost of closure performance, as less loop material is provided for engagement. Various implementations and applications may necessitate different configurations of the strap with regards to the grip surface. For example, a strap designed for use on luggage may require nearly the entire surface to be grip material, and does not require breathability for comfort to the user. A strap utilized to secure a knee brace may need very little grip material in order to provide adequate security to the user, and will allow for more air movement through the strap, to enhance the user's comfort.

In this embodiment, the folded longitudinal edges can be secured in place using an appropriate adhesive, sewing or by heat staking, as discussed above. In some examples, the grip material itself serves as an adhesive, such that the folded edges are held in place against the base solely by adhesion from the grip material.

Grip material 322 can have any appropriate composition so as to provide a substantially non-slip surface. By "non-slip" surface, we refer to any surface designed to inhibit or prevent a smooth slipping or sliding motion by providing adequate surface friction. The grip material can provide a relatively high coefficient of friction (e.g., a dynamic coefficient of friction greater than about 0.3), and may be generally "soft" or "skin friendly" to the touch. For example, soft elastomers (e.g., styrenic block copolymers, such as styrene-isoprene-styrene, styrene isoprene/butadiene styrene, and styrene-butadiene-styrene), rubbers (e.g. flouroelastomers) or silicones can be used. Other suitable compositions can also be used. For example, various plastics with modified lower molecular weight constituents and thermoplastic elastomers (e.g., modified polypropylene or modified polyethylene) can serve as a grip material. In some examples, the grip material is particularly well designed for skin contact, featuring a tack free, non-allergenic, and non-irritant composition.

Figure 6A:
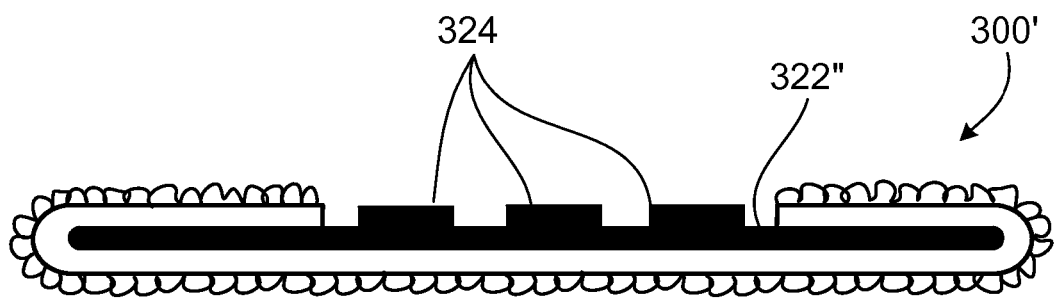
FIG. 6A is a cross-sectional view of a double-sided loop strap featuring a non-slip surface with upstanding treads.
Figure 6B:
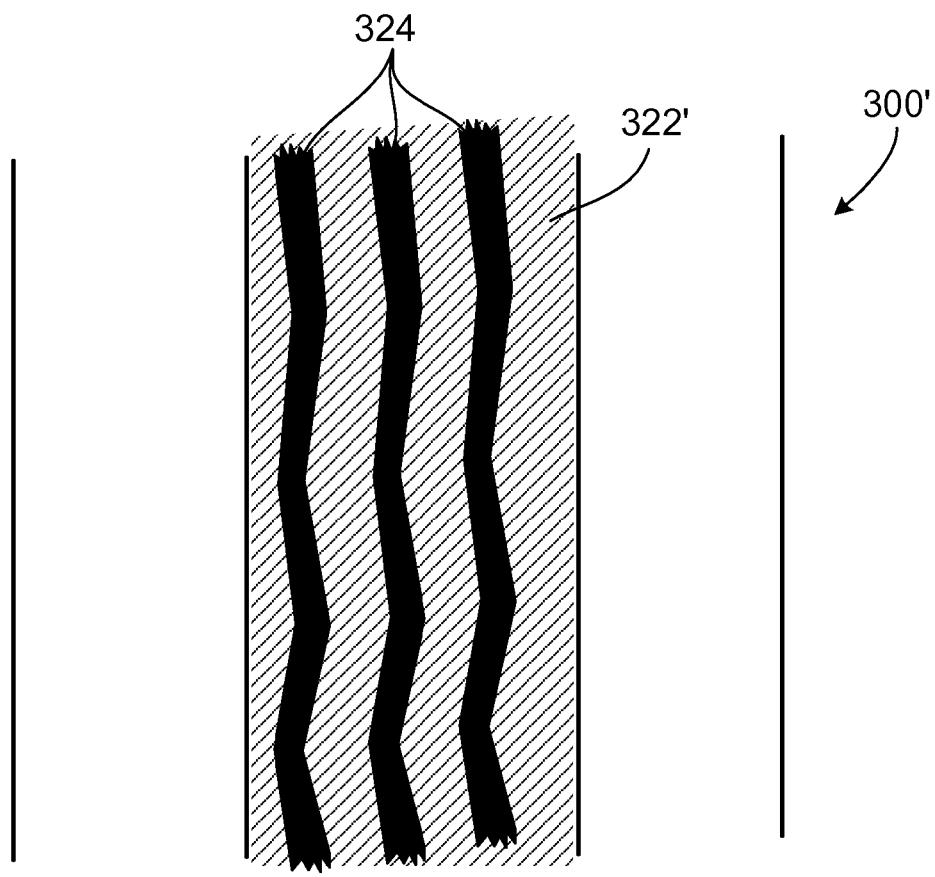
FIG. 6B is a top view of the double-sided loop strap of FIG. 6A.

FIGS. 6A and 6B show an additional example of loop strap 300' where the layer of grip material 322' provides a pattern of molded, upstanding treads 324 that provide additional surface friction for mitigating slip. In this example, the grip material includes three undulating treads extending lengthwise down the strip. Of course, other appropriate configurations are also contemplated. For example, more or less treads can be provided; the treads can extend widthwise across the strip (as opposed to lengthwise, see FIG. 8); the treads can be substantially straight (as opposed to undulating); and/or the height and thickness of the treads can vary.

Figure 7A:
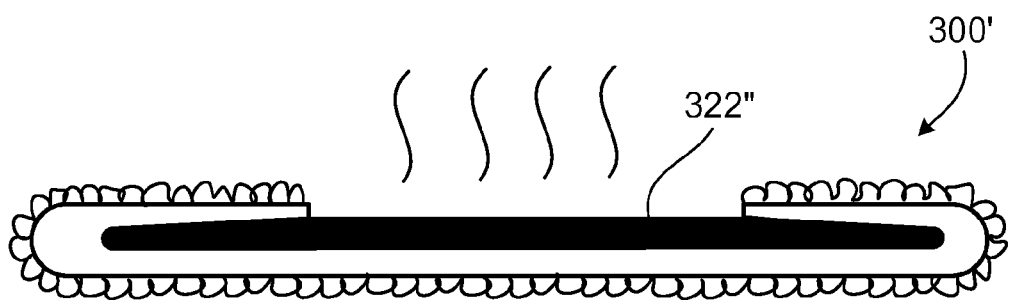
FIGS. 7A and 7B are cross-sectional views of a double-sided loop strap featuring a non-slip surface formed from a resinous, foam activated grip material.
Figure 7B:

FIGS. 7A and 7B show yet another example of loop strap 300" where the deposited grip material 322" includes a foaming agent (e.g., a heat activated foaming agent). In these examples, the loop strap is generally constructed as described above with reference to FIGS. 5A-5C. After construction, the foaming agent is activated to expand the layer of grip material 322", raising the exposed non-slip surface to be level with the neighboring loop material. In some examples, the non-slip surface is raised above the loop material.

Figure 8:
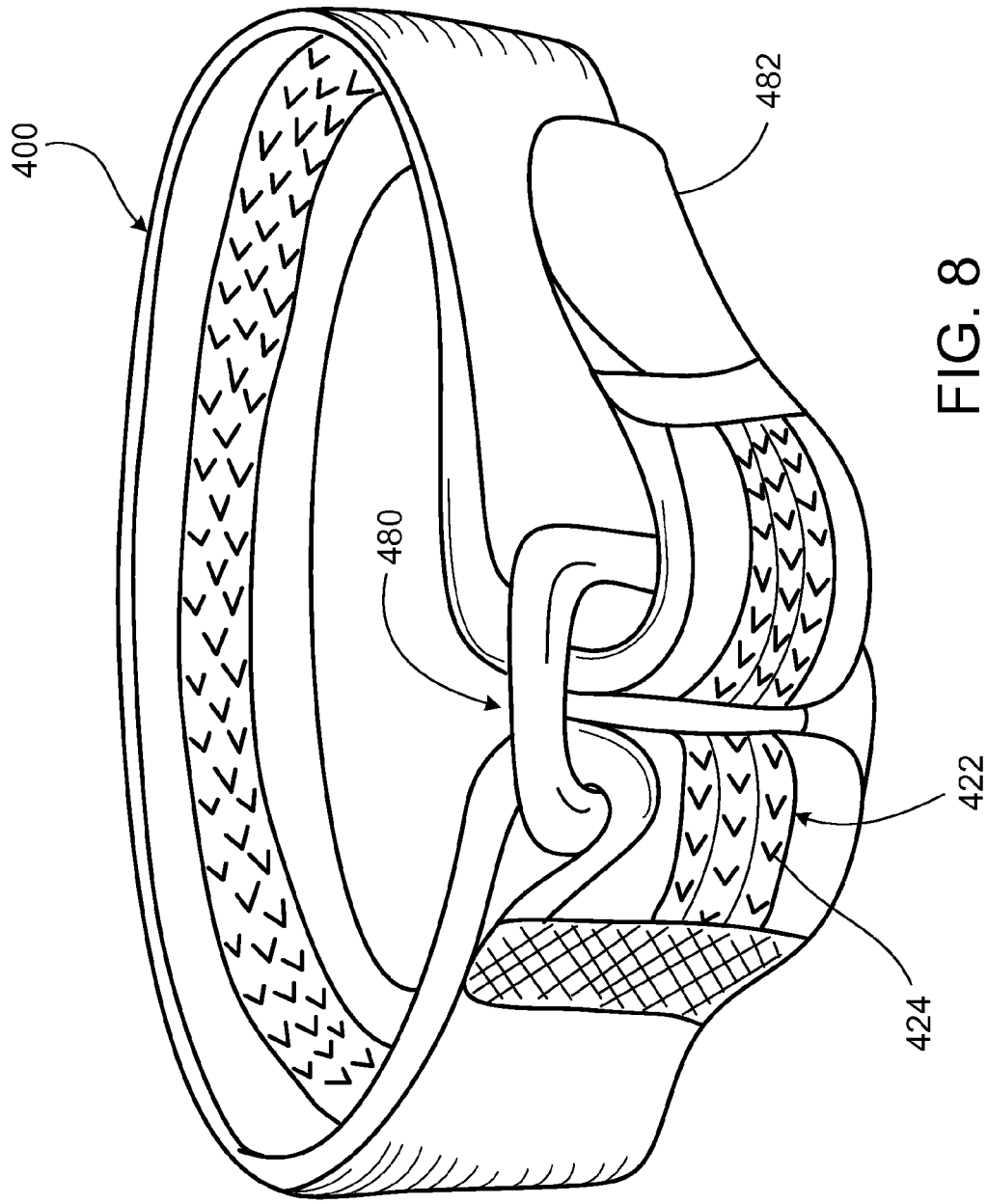
FIG. 8 is a perspective view of an adjustable cinch strap featuring a double-sided loop strap providing a non-slip surface.

FIG. 8 shows an example implementation of a double-sided loop strap 400 featuring an exposed non-slip surface having upstanding slip inhibiting treads 424 formed of an appropriate grip material 422. In this case, the loop strap 400 is used in conjunction with a buckle 480 to form an adjustable cinch strap, such as may be used to support a medical or sports device on a user. The cinch strap is formed by threading a free-end 482 of loop strap 400 through buckle 480, wrapping the loop strap around an object, re-threading the free-end back through the buckle, and folding the strap back on itself. In this example, free-end 482 provides a patch of loop compatible fasteners (e.g., hooks) to engage the loop material on either side of the grip material 422, thus securing the strap in place.

As discussed above, the non-slip surface can be level or above the surrounding loop material. In this case, the upstanding treads 424 can be designed to engage one another when the strap is folded back on itself, impeding the ability of the strap to easily release back through the buckle, essentially creating a one-way cinch strap. If the grip connection between both elements is designed with appropriate strength for the application, the uni-directionality, coupled with the presence of the buckle, could even hold the strap in place, without the above mentioned loop compatible fasteners on the free-end of the strap. In some examples, the non-slip surface is recessed relative to the surrounding loop material. This configuration would render the loop strap more comfortable when pressed against a user's skin and provide less interference with the buckle of the cinch strap. Either of these above described configurations may prove useful in various applications.

Figure 9A:
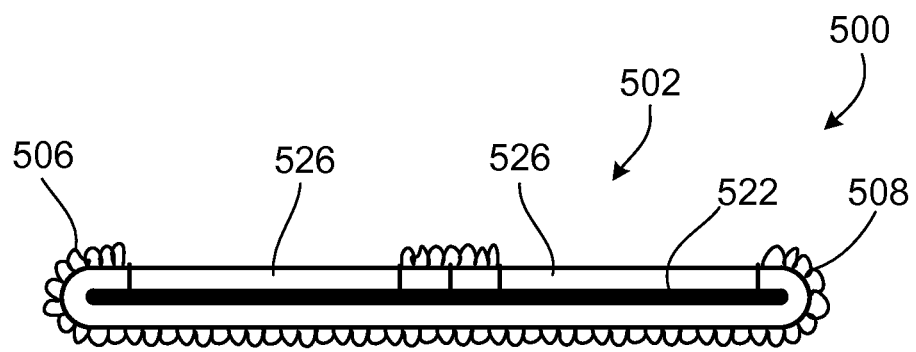
FIG. 9A is a cross-sectional view of a double-sided loop strap featuring multiple discrete non-slip surfaces.
Figure 9B:
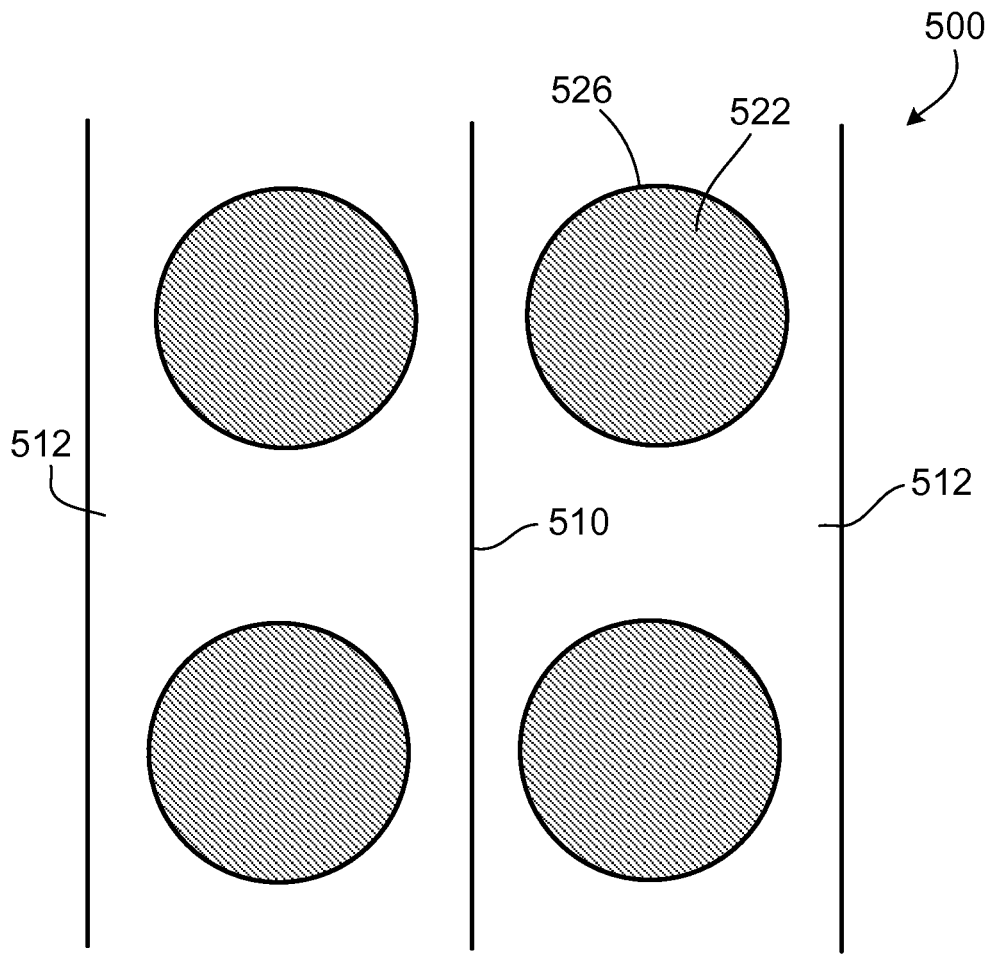
FIG. 9B is a top view of the double-sided loop strap of FIG. 9A.

FIGS. 9A and 9B show another example loop strap 500 having a front side 504 and a back side 502, each of which presents a field of upstanding, hook compatible loops 506. In particular, loop strap 500 is a two-layer construction fashioned from a preform elongated strip of loop material 508 including a flexible base bearing a field of loops 506 and defining free longitudinal edges 510, which are folded over to form two inwardly facing arms 512. Each of arms 512 defines a patterned set of discrete apertures 526 that extend entirely through the flexible base.

Similar to the previous examples, a thin layer of grip material 522 is deposited on an inboard portion of the flexible base. However, in this case, longitudinal edges 510 are completely folded over the layer of grip material 522 to meet near a center portion of strip 508, such that the layer of grip material is entirely sandwiched between the two layers of loop material. As shown, apertures 526 are aligned with the grip material 522 so as to leave various portions of the grip material surface exposed. The exposed surface of the grip material is recessed relative to the neighboring loop-bearing surface and bounded by the edges of the apertures.

Several of the foregoing examples (shown in FIGS. 5A-9B) provide double-sided loop straps that offer a substantially non-slip surface of grip material bounded by folded portions of a preform strip of loop material. The folded portions of the loop material effectively hide the edges of the deposited resinous grip material, which may be unsightly and rough because it can be difficult to produce a uniform resin edge.

Figure 10A:
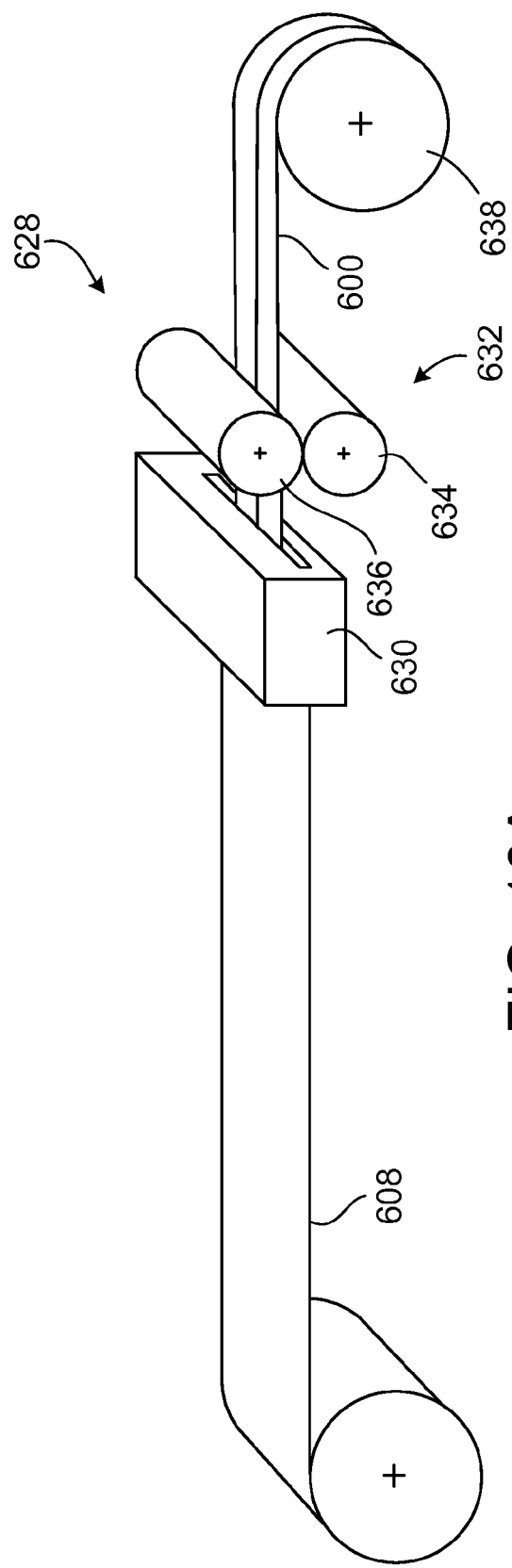
FIG. 10A is a schematic representation of a first method and apparatus for making a double-sided loop strap.

FIG. 10A shows an example apparatus 628 which is suitable for manufacturing a double-sided loop strap 600, such as described above. Apparatus 628 receives a preform strip of loop material 608 provided in the form of an elongated flexible substrate carrying a field of upstanding loops on one side. Preform strip 608 is fed to a folding device 630 that folds the longitudinal edges of strip 608 inward to overlap an inboard portion of the flexible base. The folded, two-layer strip is introduced to a heat staking machine 632 that creates the prescribed patterns of bonded regions by fusing the two layers of material together at various discrete points. The resulting double-sided loop strap 600 is then spooled onto a final product roll 638.

The folding device and heat staking machine can be selected from a wide variety of conventional equipment. In the present example, heat staking machine 632 includes a patterned roller 634 having individual projections extending from its outer surface, and a horn 636 for facilitating the ultrasonic vibration with the folded strip 608 against the patterned roller.

Figure 10B:
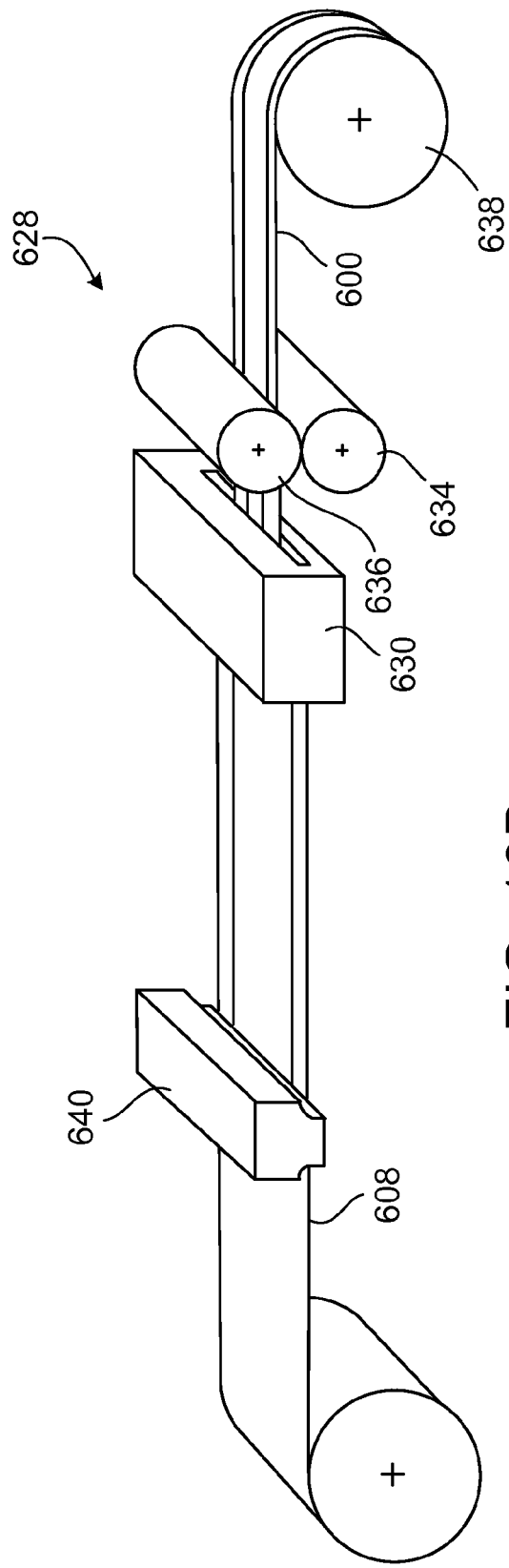
FIGS. 10B-10E are schematic representations of a second method and apparatus for making a double-sided loop strap featuring a non-slip surface.
Figure 10C:
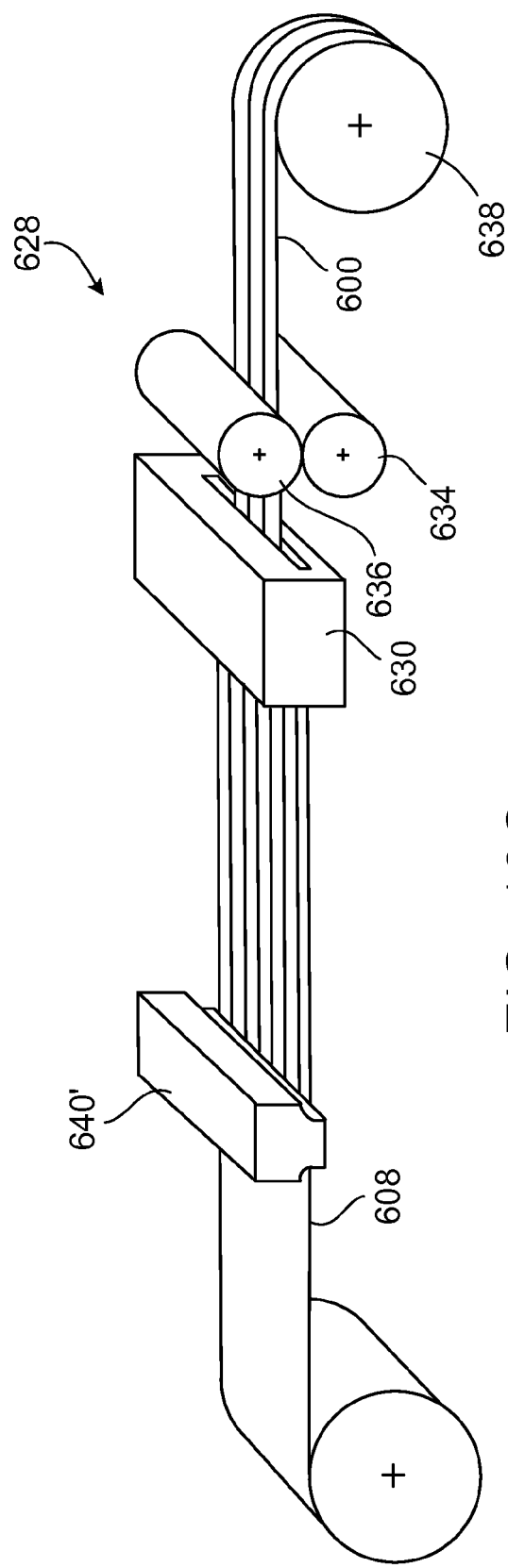
Figure 10D:
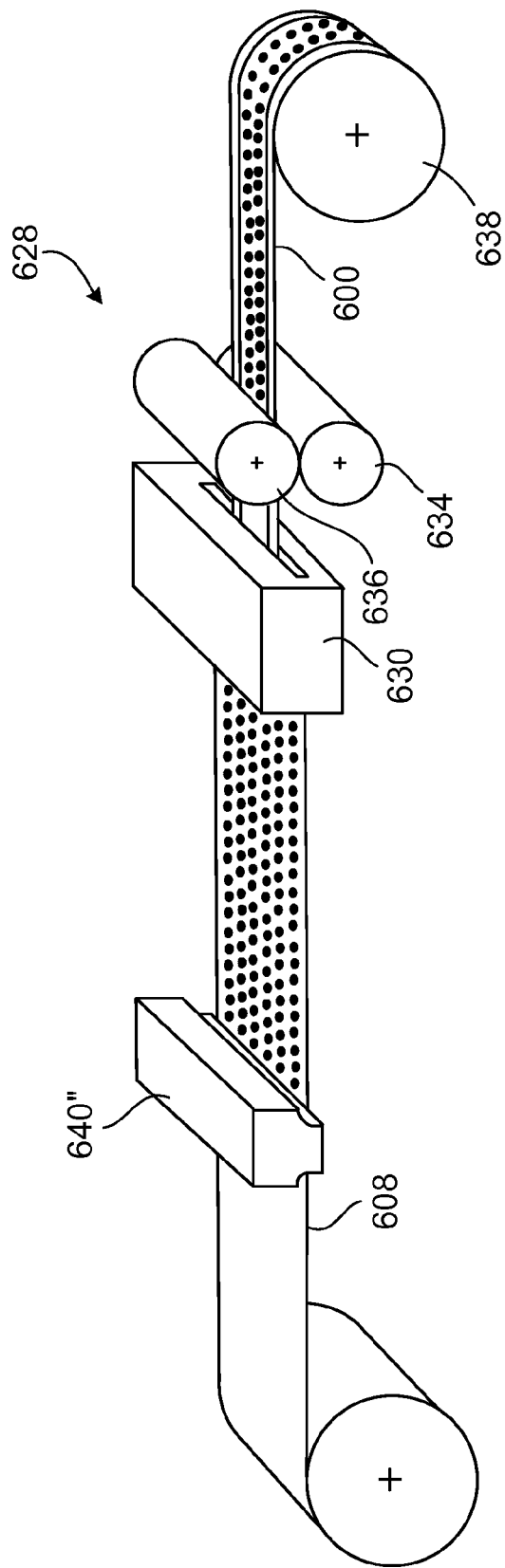
Figure 10E:
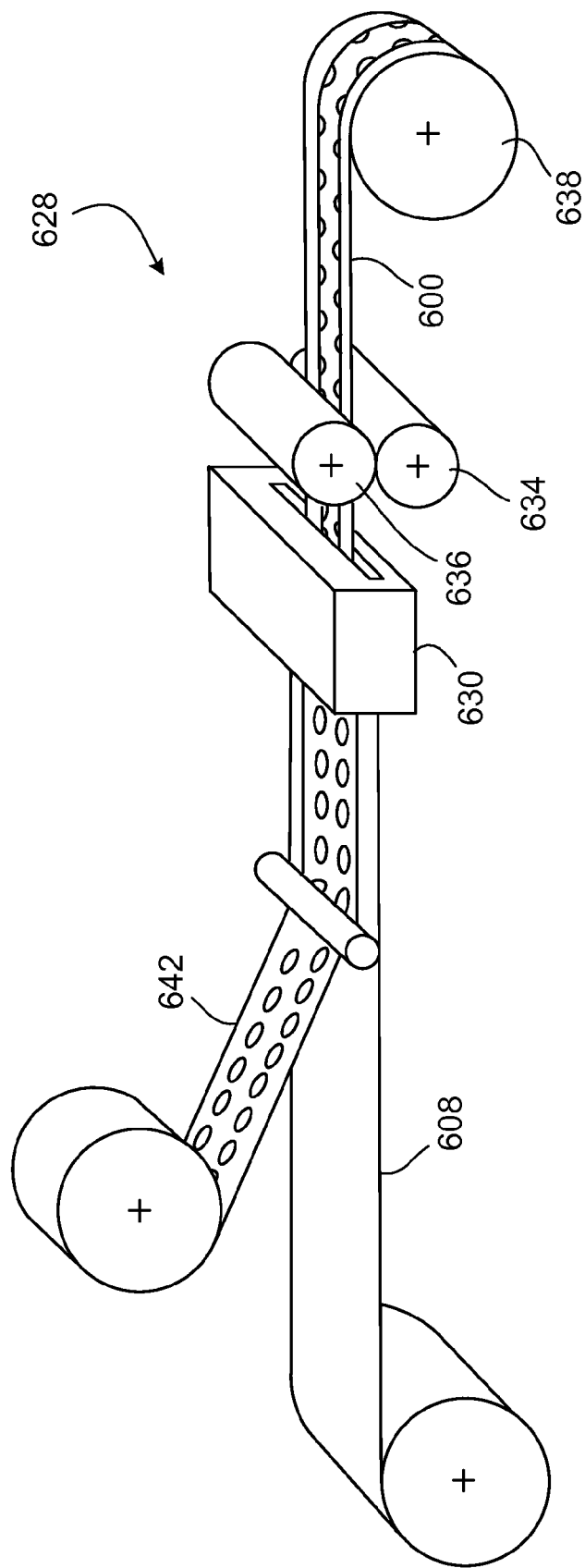

FIGS. 10B-10E show how apparatus 628 can be adapted for forming a non-slip surface on the double sided loop strap by depositing grip material on a back side of the preform strip of loop material prior to folding. In FIG. 10B, a resin applicator 640 is positioned upstream of folding device 630. Resin applicator 640 extrudes a solid layer of grip material onto the back of the loop surface prior to folding. The rollers 634, 636 after the folding station can either be used to simply seal the folded product utilizing the grip material as the bonding agent or could be ultrasonic welders to bond the fold in place (as described above). In FIG. 10C, resin applicator 640' extrudes multiple strands of grip material onto the back of the loop surface prior to folding. In FIG. 10D, a resin applicator 640" is designed to extrude dots of grip material onto the back of the loop surface prior to folding. In FIG. 10E, a roll of film based grip material 642 is placed on the back of the loop surface prior to folding. In this example, the film of grip material includes an array of openings to improve breathability of the double-sided loop strap. The grip material, however, can also be a solid film or a film that includes micro perforations.

While a number of examples have been described for illustration purposes, the foregoing description is not intended to limit the scope of the invention, which is defined by the scope of the appended claims. There are and will be other examples and modifications within the scope of the following claims. For example, modifications could include punching holes in the loop strip to further improve flexibility and breathability of the double-sided loop strap.

What is claimed is:

1. A method for forming a double-sided loop strap, the method comprising:
    receiving a continuous longitudinal strip of loop material comprising a strip-form base bearing a field of upstanding loops on a fastening side of the strip bounded by opposite longitudinal edges;
    folding each of the longitudinal edges away from the fastening side, such that the base overlaps itself; and
    securing the folded edges in place by permanently bonding together overlapped areas of the base to form the double-sided loop strap,
    wherein the bonding forms discrete bonded regions of the base surrounded by unbonded area, the bonded regions including a row of the bonded regions extending along and overlapping at least one of the folded edges, and a pattern of bonded regions surrounded by engageable loops on either side of the strap.

2. The method of claim 1, wherein folding each of the longitudinal edges comprises folding the edges sufficiently inward to meet on one side of the strap.

3. The method of claim 1, wherein the row of bonded regions forms a seam along the longitudinal edges.

4. The method of claim 1, wherein the bonded regions of the row of bonded regions are shaped to form visually recognizable graphics.

5. The method of claim 1, wherein a density of the pattern of bonded regions varies widthwise and/or lengthwise along the strap.

6. The method of claim 5, wherein the density of the pattern of bonded regions gradually increases from a center area of the strap in an outboard direction.

7. The method of claim 1, wherein permanently bonding comprises heat staking overlapped areas of the base.

* * * * *